United States Patent [19]

Plumberg

[11] 3,930,226

[45] Dec. 30, 1975

[54] AUTOMATIC TAMPER ALARM FOR MOTOR VEHICLES

[75] Inventor: Leonard G. Plumberg, Olathe, Kans.

[73] Assignee: Donald E. Funck, Overland Park, Kans.

[22] Filed: Apr. 22, 1974

[21] Appl. No.: 462,659

[52] U.S. Cl. .............................. 340/64; 307/10 AT
[51] Int. Cl.² ........................................ B60R 25/10
[58] Field of Search ............ 340/52 D, 52 F, 63, 64; 307/10 AT; 180/114

[56] References Cited
UNITED STATES PATENTS

| | | | |
|---|---|---|---|
| 3,585,584 | 6/1971 | Behrend | 340/64 |
| 3,596,240 | 7/1971 | Atkins | 340/52 D |
| 3,614,734 | 10/1971 | Davis | 340/63 X |
| 3,710,317 | 1/1973 | Colsen et al. | 340/64 |

*Primary Examiner*—Alvin H. Waring
*Attorney, Agent, or Firm*—Lowe, Kokjer, Kircher, Wharton & Bowman

[57] ABSTRACT

A self resetting tamper alarm activates a motor vehicle horn when one of a plurality of input lines detects the closure of a normally open switch. The solid state alarm is a low current device which may continuously be left in a triggerable state without undue expenditure of the vehicle battery, and it is automatically disabled whenever the vehicle ignition switch is turned to "on" or "accessory."

The alarm comprises a monostable multivibrator with a time constant in the order of a few minutes. In response to an alarm input this multivibrator generates a trigger signal which activates succeeding circuitry, eventually energizing the horn. The trigger signal ceases after a few minutes in accordance with the multivibrator time constant to avoid unnecessary run down of the vehicle battery, but it will again occur if an alarm input is subsequently presented after the multivibrator resets itself.

An astable multivibrator generates a square wave output in response to the aforementioned trigger signal. This square wave output is amplified and delivered to the vehicle horn to provide a pulsating (rather than continuous) tone therefrom.

In addition, delay circuitry is provided to prevent activation of the alarm for up to a minute after a signal has occurred on preselected input lines. Thus, after opening the car door, the operator has a preselected time to enter the vehicle and prevent horn activation by turning the ignition switch to disable the alarm. Another delay circuit integral with the one shot timer also allows the driver to stop the car and exit therefrom without triggering the alarm. For various other inputs however, the first delay circuitry is inoperative and an immediate alarm response will occur unless the alarm has been disabled.

3 Claims, 1 Drawing Figure

AUTOMATIC TAMPER ALARM FOR MOTOR VEHICLES

BACKGROUND AND BRIEF SUMMARY OF THE INVENTION

This invention relates generally to motor vehicle alarms. More particularly, the invention relates to a solid state, low current auto alarm which, except for built in delays, continuously and automatically remains in a triggerable state without the necessity of separate switch manipulations by the owner.

Prior art auto alarms generally must be switched to an operable state by the motorist whenever protection is desired. Thus, after parking the automobile, a separate switch in a usually concealed or hidden area must be located and activated in order to energize the device. After returning to the car, the owner must again locate and flip this switch in order to avoid inadvertent triggering of the alarm when opening one of the car doors.

It is a fundamental object of this invention to provide a unique motor vehicle tamper alarm which need not be independently switched "on" or "off" by the operator every time he stops or starts his vehicle. The subject device is continuously connected to the vehicle power supply and the vehicle ignition switch. The alarm is disabled when the vehicle ignition switch is turned to either the "on" or "accessory" position. Thus, the ignition key itself "sets" and "resets" the device —no extra switches are necessary. The invention may thus be advantageously employed in any vehicle utilizing a primary ignition switch, such as an aircraft, automobile, or a boat.

A time delay circuit is provided so that the alarm will not be triggered by door switches until after the motorist has had sufficient time to enter the car and turn the ignition switch. If he does so in time, turning of the ignition key disables the alarm thereby preventing inadvertent firing. On the other hand, when the vehicle is to be parked, a delay circuit affords the driver a preselected time to withdraw the ignition key, open a door, and exit, without triggering the alarm. At the expiration of this time the alarm will be ready to respond to further inputs. Undelayed auxiliary inputs, however, will trigger the alarm immediately in response, for example, to the opening of the hood, so that vandals will have insufficient time to remove or disconnect the battery or horn.

A further object of this invention is to provide a plurality of inputs for a unique motor vehicle alarm which, when connected to the simple normally open switches used in most motor vehicles, will derive a sufficient input to trigger the alarm. A plurality of input lines, isolated from one another by diodes, have been provided in the subject invention. Some of these inputs will immediately fire the alarm, while some are delayed. In any case, the alarm can be fired by simple grounding of these inputs. For example, one such input is derived from the vehicle's standard door switches which make contact with ground in response to opening of the door to activate the dome lights.

A further object of this invention is to provide a unique auto alarm of the character described which will intermittently honk the vehicle horn. When a car horn is continuously sounding a bystander may casually assume a short circuit has developed. On the other hand, when the horn is pulsating, bystanders are more likely to be alerted to suspicious activities. Accordingly, the subject device employs an astable multivibrator to provide pulsating actuation of the vehicle horn relay.

Yet another object of this invention is to provide an auto alarm which will automatically deactivate when appropriate. Thus, when the operator inadvertently sets off the alarm he need merely wait a predetermined time for it to automatically deactivate. It is unnecessary for him to push any buttons or flip any switches. If, however, an input is presented at the end of this time, the alarm will again be activated. Accordingly, a trigger signal is developed within the device by a monostable multivibrator having a time constant of approximately two minutes, during which time it will remain set if an alarm input has occurred. The trigger signal thus developed fires the aforementioned astable multivibrator to cause activation of the vehicle horn. After two minutes, the monostable returns to its stable state and requires another input before the process will be repeated.

A further object of this invention is to provide an auto alarm which will avoid unnecessary running down of the vehicle battery. The previously mentioned one shot multivibrator trigger generator facilitates this object by periodically resampling the alarm inputs in order to ascertain whether horn activation remains necessary. However, since the monostable responds only to a voltage transient, another switch closure must occur before it will be set. Thus, if a door fails to close, the horn will sound for only 2 minutes. Additionally, the alarm unit is comprised of low power COS-MOS integrated circuitry which minimizes static battery drain while in the "triggerable" state, so that the device offers continuous protection for up to 6 months without recharging the vehicle storage battery.

It is yet another object of this invention to provide an auto alarm of the character described having an extremely low cost. Inexpensive, readily available components are utilized throughout, and manufacturing assembly costs are reduced by the use of integrated circuits. Furthermore, the trigger inputs to the device and the automatic disabling feature can be derived from switches which are already included in most automobiles.

Yet another object of this invention is to provide the consumer with a choice of both "delayed" and "undelayed" alarm inputs. Accordingly, an RC circuit is provided in conjunction with preselected alarm input terminals to temporarily delay the firing of the alarm in response to these inputs. On the other hand, various other preselected inputs bypass the delay circuitry to immediately trigger the alarm.

Other and further objects of this invention, together with the features of novelty appurtenant thereto, will appear in the course of the following description.

DETAILED DESCRIPTION OF THE INVENTION

Figure 1:
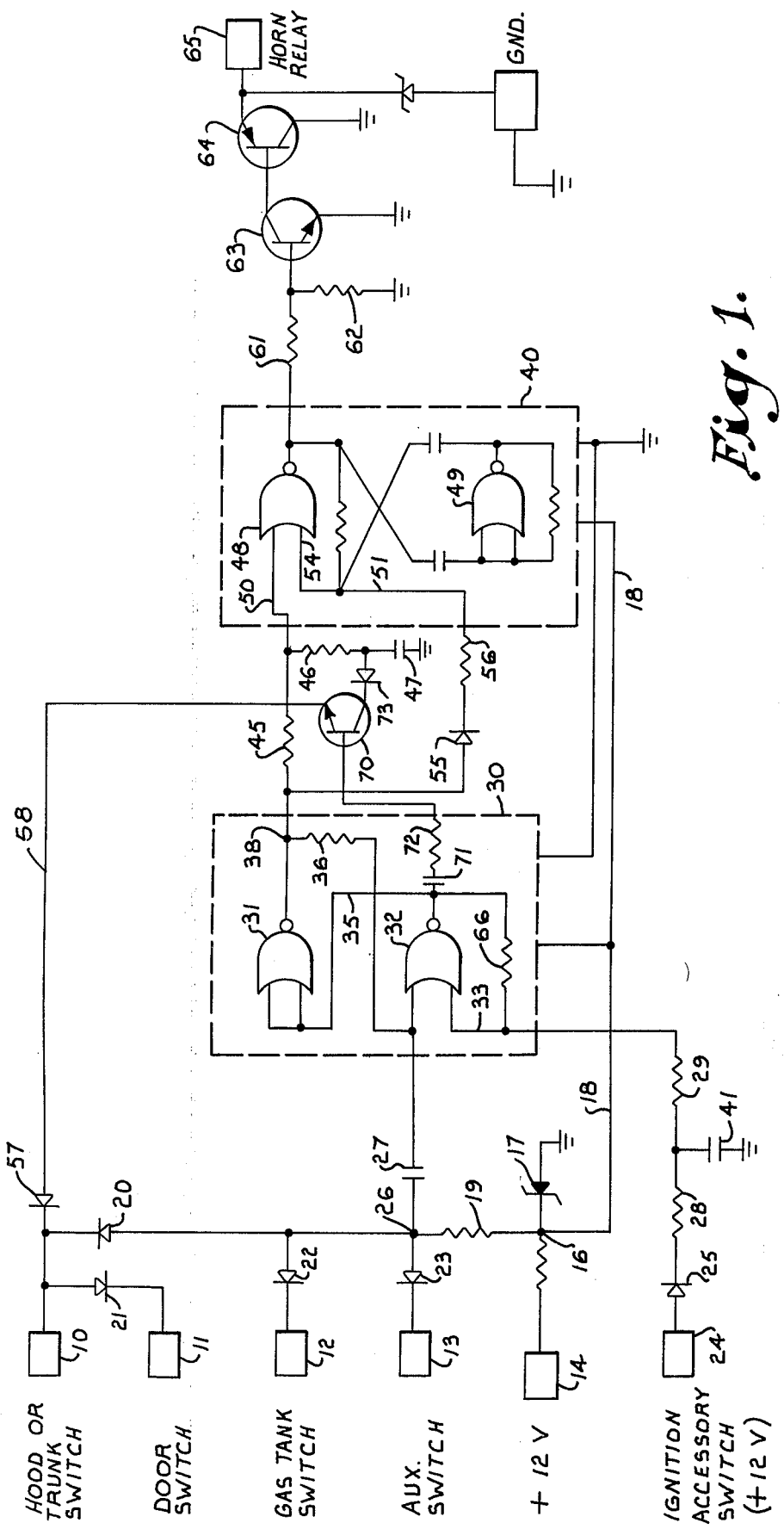

In the accompanying drawing, which forms a part of the specification and is to be read in conjunction therewith, and in which like reference numerals are employed to indicate like parts therein:

FIG. 1 is a schematic diagram of the auto alarm constructed in accordance with the principles of this invention.

With reference to FIG. 1, there is seen an automatic alarm for motor vehicles having a plurality of trigger input terminals 10–13. Grounding of any of these terminals is sufficient to initiate alarm operation. Each of these inputs is derived from a normally open standard switch of the type commonly found in automobiles. For example, the spring-biased dome light switches which are used to electrically ground one end of the dome light in response to the opening of a door provide ideal inputs to this device. However, any switch which is capable of grounding one of the terminals 10–13 is suitable for triggering this alarm.

Power is delivered to the alarm from the vehicle storage battery or electrical system via terminal 14. Current reaching node 16 is distributed to the circuitry via resistor 19 and line 18. Zener diode 17 provides transient protection.

Input terminals 10–13 are connected to node 26 by isolating diodes 20–23, respectively, and when any of these terminals is grounded the voltage at node 26 drops severely. This voltage drop is transmitted through differentiator capacitor 27, thereby firing monostable multivibrator 30, which has a time constant in the order of a few minutes determined by C-41, R-66 and R-29. NOR gates 32 and 31 are located within a low power COS-MOS integrated circuit comprising multivibrator 30. The outputs of each of these NOR gates is coupled to the other through line 35 and resistor 36, respectively.

When multivibrator 30 is set in response to an input to terminals 10–13, the output, appearing at node 38, will go from a "high" state to a "low" state. Capacitor 27 insures that the multivibrator will fire only in response to a "transient." This output will remain low (i.e., the multivibrator will remain "set") for approximately 2 minutes, at which time it will automatically return to its stable state, (i.e., a "high" output), and if one of the input terminals is subsequently grounded the cycle will repeat itself. Thus, after the alarm has sounded the car horn for approximately 2 minutes, it will stop. If another input occurs, the alarm will repeat the cycle accordingly. Consequently, the car horn will not be left on for more than two minutes so that the battery will not be fully drained. If the alarm has been inadvertently set off, the owner need merely wait two minutes for the device to reset itself and silence the horn. However, if this is too long to wait, the ignition key may be turned on momentarily to immediately disable the device.

An astable multivibrator 40 comprises a pair of NOR gates 48 and 49. This multivibrator comprises an oscillator which generates a square wave having a frequency of approximately 1 Hz. The output of this multivibrator is delivered to a pair of current amplifying transistors 63 and 64 via a voltage divider comprised of resistors 61 and 62. When the astable multivibrator is activated, an intermittent ground signal will be presented to horn relay 65.

In order to activate multivibrator 40, the inputs to NOR gate 48, appearing on lines 50 and 54, must both be low. Both of these inputs are derived from node 38 so that one shot multivibrator 30 controls or triggers the oscillator.

The alarm becomes disabled when terminal 24 is connected to a source of positive voltage. When this occurs, the input to NOR gate 32 appearing on line 33 through diode 25 and resistors 28 and 29 will become "high." A high input to NOR gate 32 produces a low output which is inputted to gate 31 via line 35. A low input to NOR gate 31 in turn produces a high output at node 38, which disables NOR gate 48 and multivibrator 40 via diode 55, resistor 56 and line 51. Terminal 24 is connected to the vehicle ignition and/or accessory switch so that when the driver turns the key in either direciton, the alarm is instantly disabled. Termainal 24 is connected to an accessory terminal of the fuse block. Accessory terminals go high when the ignition switch is turned either way. Thus, no additional switch need be manipulated to disable the alarm.

Delay circuitry comprised of capacitor 47 and resistors 45 and 46 cooperates with the aforementioned disabling effect of terminal 24 to afford the driver approximately twenty seconds to get into the car and turn the ignition switch (thereby energizing terminal 24 and disabling gate 32) before the alarm will sound in response to the opening of the car door. Terminals 11–13 comprise the "delayed" inputs to the device. When an input appears on either of terminals 11–13, multivibrator 30 becomes set for a preselected time whether or not an input ceases during this interval, i.e., whether or not the car door is immediately shut.

When monostable multivibrator 30 is in its stable state (i.e., not in the "set" state), the output at node 38 is high, and multivibrator 40 is inoperative because of the high inputs to gate 48 appearing on lines 50 and 54. During this interval capacitor 47 will charge up to approximately 12 volts through resistors 45 and 46. When multivibrator 30 is set in response to an input, the voltage at node 38 drops. However, multivibrator 40 temporarily remains inoperative because of the high input which it receives on line 50 until capacitor 47 discharges. When discharge occurs, NOR gate 48 will fire as both of its inputs will then be low. The time constant of this delay feature is determined by the values of capacitor 47 and resistors 45 and 46 which may be varied if necessary to suit individual applications.

The delay circuitry also affords the driver time to park, and open a door and exit from the vehicle without triggering the alarm. When the vehicle is being operated, terminal 24 is positive and multivibrator 30 is disabled, so that the voltage at node 38 is high. Capacitors 47 and 41 will thus be charged. After the ignition key is withdrawn the monostable will not respond to a door opening until C-41 has discharged and the astable multivibrator 40 will not respond until C-47 has partially discharged. If the door has been opened within this time the alarm will not have been triggered. The alarm will, however, be ready to respond to further inputs. Again, the manipulation of a separate switch is unnecessary.

The aforementioned delay circuitry comprising C-47 is "by-passed" if an input appears at terminals 10 and 11 and the alarm will sound immediately. For example, if either terminal 10 or 11 is grounded, the monostable 30 is triggered through diode 20. At the same time the ground condition appears at the emitter of transistor 70. The high voltage (from line 35) cooperates with the low (ground on the emitter of transistor 70) to turn on transistor 70 and discharge capacitor C-47. Diode 73 helps eliminate leakage current from line 35 back through the base of transistor 70 and on to capacitor C-47. This isolates capacitor C-47 allowing it to always sufficiently discharge. Capacitor C-71 and resistor R-72 differentiate the output from monostable 30 (line 35) allowing transistor 70 to turn off within a short time, thereby leaving the control of capacitor C-47 to the monostable through node 38. Thus, if the hood or trunk is opened, the alarm will fire before a battery or tire can be stolen. The terminal 10 input can also be advantageously used to protect stereo tape players or two-way radio equipment.

An input to terminal 10 reaches monostable multivibrator 30 through isolating diode 20, and this multivibrator will function as before. For example, alarm disabling will occur when terminal 24 becomes positive and the two minute set and reset cycle will occur as previously discussed. However, the delay feature provided by capacitor 47 and the various resistors is avoided when terminal 10 is grounded because diode 57 will immediately lower the voltage on lines 58 and 50. Thus, NOR gate 48 will operate instantly providing a low input also appears on line 54. When lines 50 and 54 are both low astable multivibrator 40 will again oscillate, thereby generating a square wave signal which will be amplified and transmitted to the horn relay by transistors 63 and 64.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that 11 matter herein set forth or shown in the accompanying drawings is to be interpreted as illustrative and not in a limiting sense.

Having thus described my invention, I claim:

1. A tamper alarm for motor driven vehicles for activating an external transducer in response to preselected events, the alarm having an output and functioning in cooperation with the vehicle ignition switch, the alarm comprising:

a plurality of alarm input means for initiating alarm circuitry operation in response to inputs delivered thereto;

means for generating a trigger signal for a predetermined time interval in response to at least one of said alarm inputs, the trigger signal generation means comprising a monostable multivibrator having at least one input and an output, one of said monostable multivibrator inputs interconnected with said alarm input means;

means for generating an intermittent output signal for said external transducer in response to said trigger signal, the last mentioned means comprising an astable multivibrator having at least one input and an output, the astable multivibrator inputs interconnected to said monostable multivibrator output, means for interconnecting said astable multivibrator output with said external transducer, means cooperating with the vehicle ignition and/or accessory switch for automatically disabling said alarm whenever said vehicle ignition and/or accessory switch is activated, said monostable multivibrator comprising at least one NOR-gate having at least one input and said alarm disabling means further comprises an interconnection between said vehicle ignition and/or accessory switch and said NOR-gate input, the interconnection operable to disable said monostable multivibrator by turning off said NOR-gate when said ignition switch is turned to the ignition on or accessory position.

2. The combination as in claim 1 including means for delaying the response of said alarm for a preselected time after said ignition switch is turned off, the last mentioned means comprising a capacitor connected between ground and said monostable multivibrator input, the capacitor operable to charge when said vehicle ignition/accessory switch is on and discharge when said vehicle ignition/accessory switch is off, the response of said monostable multivibrator thereby being delayed until said capacitor substantially discharges.

3. The combination as in claim 2 wherein said delay means further comprises means for inhibiting said intermittent alarm output signal generator for a preselected time after an alarm input, the last mentioned means comprising a capacitor connected between ground and one of said astable multivibrator inputs, the capacitor operable to charge when said monostable multivibrator output is high and discharge when said monostable multivibrator output is low, said capacitor preventing said astable multivibrator from functioning until it is discharged to a preselected level.

\* \* \* \* \*